United States Patent
Hinson (10) Patent No.: US 8,452,826 B2
(45) Date of Patent: May 28, 2013

(54) DIGITAL FREQUENCY CHANNELIZER

(75) Inventor: Jerry R. Hinson, Mountain View, CA (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 627 days.

(21) Appl. No.: 12/773,790

(22) Filed: May 4, 2010

(65) Prior Publication Data

US 2011/0274222 A1 Nov. 10, 2011

(51) Int. Cl.
*G06F 17/17* (2006.01)
*G06F 17/10* (2006.01)

(52) U.S. Cl.
USPC .................. 708/313; 708/300; 708/303

(58) Field of Classification Search
None
See application file for complete search history.

(56) References Cited

U.S. PATENT DOCUMENTS

| | | | |
|---|---|---|---|
| 6,449,244 | B1 | 9/2002 | Loseke |
| 6,680,972 | B1 | 1/2004 | Liljeryd et al. |
| 6,907,083 | B2 | 6/2005 | Lillington |
| 2003/0076899 | A1 | 4/2003 | Kumar et al. |
| 2007/0274374 | A1* | 11/2007 | Abraham ................ 375/148 |
| 2008/0012710 | A1 | 1/2008 | Sadr |
| 2009/0168924 | A1* | 7/2009 | Gomez et al. ............. 375/340 |
| 2010/0303181 | A1* | 12/2010 | Yu .......................... 375/346 |
| 2011/0267130 | A1* | 11/2011 | Hinson ..................... 327/334 |

OTHER PUBLICATIONS

Lillington, John, RF Engines Limited White Paper, "The Pipelined Frequency Transform (PFT) (PFR architecture and comparisons with FFT / digital down-converter techniques)", Reference No. PFT 001. Rev2, RFEL, pp. 1-14, Last Updated Feb. 20, 2002.
International Search Report and Written Opinion for International Application No. PCT/US2011/35079, mailed Sep. 9, 2011.

* cited by examiner

*Primary Examiner* — Scott Sun
(74) *Attorney, Agent, or Firm* — Christie, Parker & Hale, LLP (57) ABSTRACT

A method and apparatus provide digital frequency channelization of a digitally sampled input stream having a first bandwidth. The method and apparatus are implementable in software, firmware or hardware and convert a first set of real samples from the input stream into a first plurality of complex samples with a first functional block performing filtering, decimation and tuning functions, convert the first plurality of complex samples into a first pair of consecutive USB and a first pair of consecutive LSB complex samples with a second functional block performing filtering, decimation and tuning functions, and convert the first pair of consecutive USB and the first pair of consecutive LSB complex samples into a two pairs of complex USB and LSB complex samples with a pair of third functional blocks performing filtering, decimation and tuning functions, and apply the two pairs of complex USB and LSB complex samples to a string of n pairs (for n greater than or equal to one) third functional blocks each performing filtering, decimation and tuning functions.

15 Claims, 7 Drawing Sheets

DIGITAL FREQUENCY CHANNELIZER

TECHNICAL FIELD

The present disclosure is directed generally to the field of digital signal processing. More particularly, it is directed to a frequency channelizer for separating a digitally sampled wideband input signal into a plurality of individual separate channels based on frequency and suitable for further processing.

BACKGROUND

A Digital Frequency Channelizer is widely-used digital signal processing (DSP) operation that splits the spectrum of a digitized signal into channels of smaller frequency bands. The Fast Fourier Transform (FFT) is a commonly-used signal processing algorithm that transforms a single signal spectrum into multiple output channel spectrums. In using an FFT, the number of output channels is determined by the length of the FFT and is given by the equation $n=2^k$ where n is the number of output channels produced by the FFT and k is the length of the FFT. The output channels from an FFT equally split the Nyquist spectrum input to the FFT. A key restriction for the FFT algorithm is that for a given length, the FFT algorithm can produce only one set of equally-split output channels.

OVERVIEW

An embodiment of the present invention is directed to an implementation of a digital frequency channelizer that simultaneously provides filtered channelized outputs over a range of filter bandwidths. Real digital samples are tuned, filtered and decimated in successive stages to generate output sets for a span of center frequencies with a span of signal bandwidths. In accordance with one embodiment the digital frequency channelizer architecture provides multiple outputs at various different bandwidths simultaneously which is not possible using a Fast Fourier Transform (FFT) architecture.

The digital frequency channelizer architecture is suitable for hardware implementation in FPGAs and ASICs as well as with firmware or software for implementation on a digital computer or microcontroller. As compared to a Fast Fourier Transform implementation, an FPGA implementation of the present invention uses substantially less logic resources and memory resources.

In one embodiment of the present invention the digital frequency channelizer splits the signal spectrum of a digitally-sampled signal into successive half-band spectrums providing an advantage over the classic FFT approach in that it simultaneously produces multiple sets of equally split output channels at each stage with the number of channels in each output set increasing by a factor 2 for each additional stage.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of methods and circuitry useable in a communications receiver. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, FPGAs, ASICs, or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Figure 1:
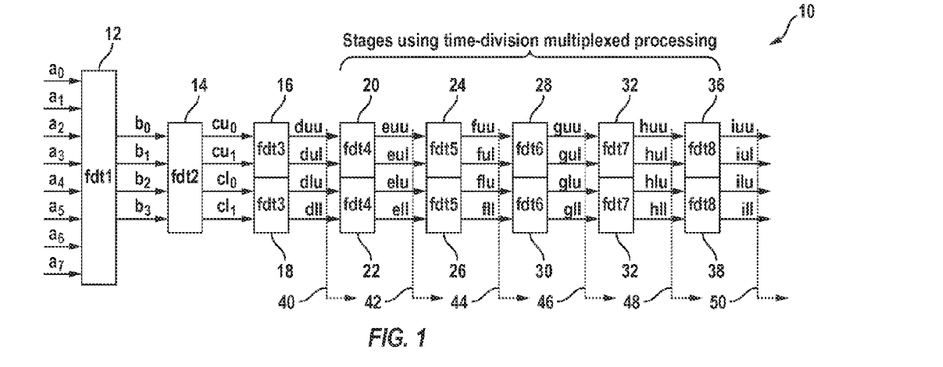
FIG. 1 is a schematic block diagram of a digital frequency channelizer in accordance with one embodiment of the present invention.

FIG. 1 is a schematic block diagram of a digital frequency channelizer in accordance with one embodiment of the present invention. The digital frequency channelizer 10 of FIG. 1 presents eight stages of successive filtering, decimating and tuning processing. The block fdt1 12 is the first stage of filtering, decimating and tuning processing, block fdt2 14 is the second stage of filtering, decimating and tuning processing, blocks fdt3 16, 18 are the third stage of filtering, decimating and tuning processing, blocks fdt4 20, 22 are the fourth stage of filtering, decimating and tuning processing, blocks fdt5 24, 26 are the fifth stage of filtering, decimating and tuning processing, blocks fdt6 28, 30 are the sixth stage of filtering, decimating and tuning processing, blocks fdt7 32, 34 are the seventh stage of filtering, decimating and tuning processing and blocks fdt8 36, 38 are the third stage of filtering, decimating and tuning processing. Fewer or more fdt processing blocks may be implemented as desired depending upon the bandwidths of the signals desired to be received. In accordance with one embodiment of the present invention the processed bandwidth input to fdt1 12 may be one stream of 1280 megasamples per second (Msps) for a 2× oversampled input frequency bandwidth of 640 MHz and its output to fdt2 14 may be half that or 640 Msps/320 MHz and so forth so that the output of ftd8 36, 38 is 128 streams of 5 Msps each with a bandwidth of 2.5 MHz.

In FIG. 1, block fdt1 12 accepts eight consecutive real input data samples $a_0, a_1, a_2, a_3, a_4, a_5, a_6, a_7$, as the input signal to the Digital Frequency Channelizer. Block fdt1 12 performs filtering, decimation and tuning on these inputs and produces four consecutive complex output data samples, $b_0, b_1, b_2, b_3$, representing the original input spectrum tuned by frequency $$\frac{F_s}{-4},$$

decimated by 2 and filtered to the Nyquist bandwidth. Block fdt2 14 accepts the four inputs, $b_0, b_1, b_2, b_3$, and performs filtering, decimation and tuning to produce two pairs of output signals with $cu_0, cu_1$, representing two consecutive complex samples of an upper sideband (USB) signal and $cl_0, cl_1$, representing two consecutive complex samples of a lower sideband (LSB) signal. Blocks fdt3 16, 18 accept the two inputs, $cu_0, cu_1$, or $cl_0, cl_1$, and perform filtering, decimation and tuning to produce two signals with duu or dlu, representing a complex sample of a USB signal and dul or dll representing a complex sample of an LSB signal. Blocks fdt4 20, 22, fdt5 24, 26, fdt6 28, 30, fdt7 32, 34, and fdt8 36, 38 all accept one USB and one LSB complex sample as illustrated in FIG. 1. Each of the blocks fdt4 20, 22 through fdt8 36, 38 buffers and de-interleaves these streams of USB and LSB samples into pairs of pairs. From these pairs of samples for each stream, the respective fdt blocks perform filtering, decimation and tuning to produce two time-division multiplexed output signals, one representing a USB signal and one representing an LSB signal. With each stage of filtering, tuning and decimation, the input spectrum at the input to each stage is split into two spectral bands so that the output of fdt1 12 has one spectral band, fdt2 14 has two spectral bands, fdt3 16, 18 has four spectral bands, ftd4 20, 22 has eight spectral bands, ftd5 24, 26 has 16 spectral bands, ftd6 28, 30 has 32 spectral band, ftd7 32, 34 has 64 spectral bands and ftd8 36, 38 has 128 spectral bands. Corresponding signal bandwidth pickoffs are available at, e.g., 40, 42, 44, 46, 48, 50 on FIG. 1.

Figure 2:
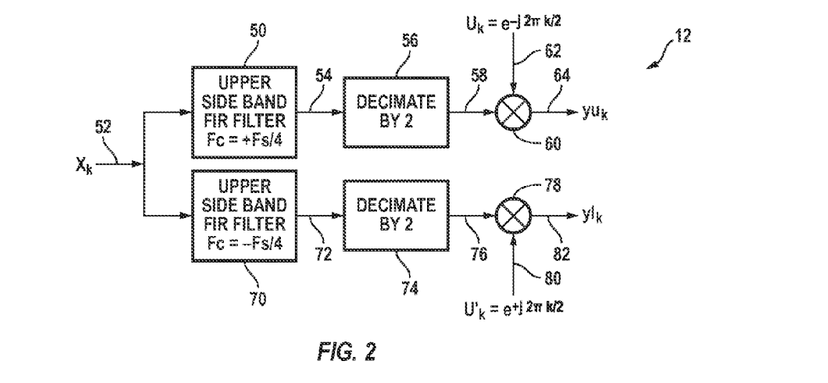
FIG. 2 is a schematic block diagram of a filter-decimation-tuner at the first stage of a digital frequency channelizer in accordance with one embodiment of the present invention.

FIG. 2 is a schematic block diagram of a filter-decimation-tuner at the first stage of a digital frequency channelizer in accordance with one embodiment of the present invention. FIG. 2 illustrates the detailed processing in the stage 1 fdt1 12 of the digital frequency channelizer of FIG. 1. In the upper portion of FIG. 2 (USB processing path) a USB FIR (finite impulse response) filter 50 filters the input signal $x_k$ on line 52 and produces a filtered USB signal on line 54 which has been sufficiently filtered of the LSB signal and other out-of-band signal components to support the decimation process that follows. A decimator 56 accepts the filtered USB signal on line 54 and discards every other sample thereby decimating the signal by a factor of 2 to produce a filtered decimated USB complex signal on line 58. A tuner implemented by multiplier 60 tunes the filtered decimated USB complex signal on line 58 down by frequency $$\frac{F_s}{-2}$$

by multiplying the filtered decimated complex USB signal on line 58 by the sequence $$u_k = e^{-\frac{j2\pi k}{2}}$$

on line 62 for k=0, 1, 2, 3, . . . (k an integer) to produce an output USB complex signal $yu_k$ on line 64 centered on the USB center frequency.

Similarly in the lower portion FIG. 2 (LSB processing path), an LSB FIR filter 70 filters the input signal $x_k$ on line 52 and produces a filtered LSB signal on line 72 which has been sufficiently filtered of the USB signal and other out-of-band signal components to support the decimation process that follows. A decimator 74 accepts the filtered LSB signal on line 72 and discards every other sample thereby decimating the signal by a factor of 2 to produce a filtered decimated LSB complex signal on line 76. A tuner implemented by multiplier 78 tunes the filtered decimated LSB complex signal on line 76 down by frequency $$\frac{F_s}{-2}$$

by multiplying the filtered decimated complex LSB signal on line 76 by the sequence $$u_k = e^{\frac{j2\pi k}{2}}$$

on line 80 for k=0, 1, 2, 3, . . . (k an integer) to produce an output LSB complex signal $yl_k$ on line 82 centered on the LSB center frequency.

The embodiment illustrated in FIG. 2 achieves an efficient implementation by employing USB and LSB filters that are tuned to the USB and LSB center frequencies $$+\frac{F_s}{4}$$

and $$-\frac{F_s}{4}$$

respectively and by placing the location of final tuning multipliers 60, 78 at a position after the decimation functions 56, 74. With this approach, the implementation requirements for the multipliers 60, 78 are simplified as only trivial multiplications by +1,−1 are required.

Figure 3:
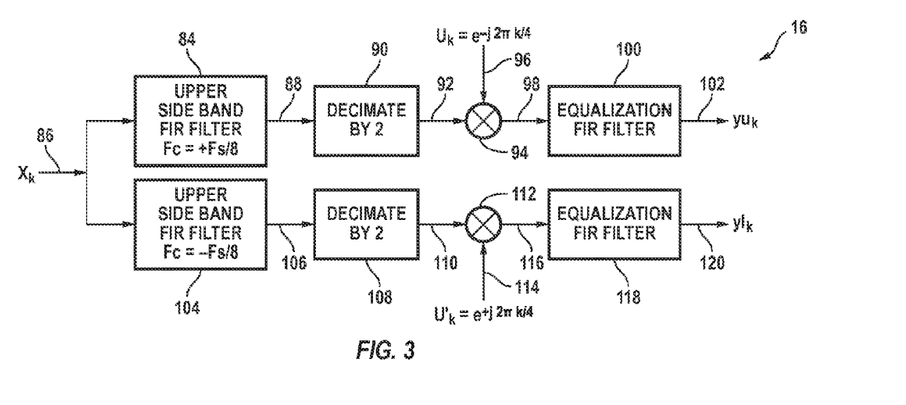
FIG. 3 is a schematic block diagram of a filter-decimation-tuner for stages 2 through 8 of a digital frequency channelizer in accordance with one embodiment of the present invention.

FIG. 3 is a schematic block diagram of a filter-decimation-tuner 16 for stages 2 through 8 of an 8-stage digital frequency channelizer in accordance with one embodiment of the present invention. In the upper portion of FIG. 3 (USB processing path), a USB FIR filter 84 filters the input signal $x_k$ on line 86 and produces a filtered USB signal on line 88 which has been sufficiently filtered of the LSB signal and other out-of-band signal components to support the decimation process that follows. A decimator 90 accepts the filtered USB signal on line 88 and discards every other sample thereby decimating the signal by a factor of 2 to produce a filtered decimated USB complex signal on line 92. A tuner implemented by multiplier 94 tunes the filtered decimated USB complex signal on line 92 down by frequency $$\frac{F_s}{-4}$$

by multiplying it by the sequence $$u_k = e^{-\frac{j2\pi k}{4}}$$

on line 96 for k=0, 1, 2, 3, . . . (k an integer) to generate a complex signal on line 98 centered on a USB center frequency. An equalization FIR filter 100 filters and equalizes the pass band of the complex signal on line 98 to produce output USB complex signal k on line 102.

Similarly, in the lower portion of FIG. 3 (LSB processing path), an LSB FIR filter 104 filters the input signal $x_k$ on line 86 and produces a filtered LSB signal on line 106 which has been sufficiently filtered of the lower sideband signal and other out-of-band signal components to support the decimation process that follows. A decimator 108 accepts the filtered LSB signal on line 106 and discards every other sample thereby decimating the signal by a factor of 2 to produce a filtered decimated LSB complex signal on line 110. A tuner implemented by multiplier 112 tunes the filtered decimated LSB complex signal on line 110 up by frequency $$+\frac{F_s}{4}$$

by multiplying it by the sequence $$u'_k = e^{+\frac{j2\pi k}{4}}$$

on line 114 for k=0, 1, 2, 3, . . . (k an integer) to generate a complex signal on line 116 centered on the LSB center frequency. An equalization FIR filter 118 filters and equalizes the pass band of the complex signal on line 116 to produce output LSB sideband complex signal $yl_k$ on line 120.

The embodiment illustrated in FIG. 3 achieves an efficient implementation by employing USB and LSB filters that are tuned to the USB and LSB center frequencies $$+\frac{F_s}{8}$$

and $$-\frac{F_s}{8}$$

respectively and by placing the location of final tuning multipliers 84, 112 at a position after the decimation functions 90, 108. With this approach, the implementation requirements for the multipliers 84, 112 are simplified as only trivial multiplications by +1,+j,−1,−j are required.

Figure 4:
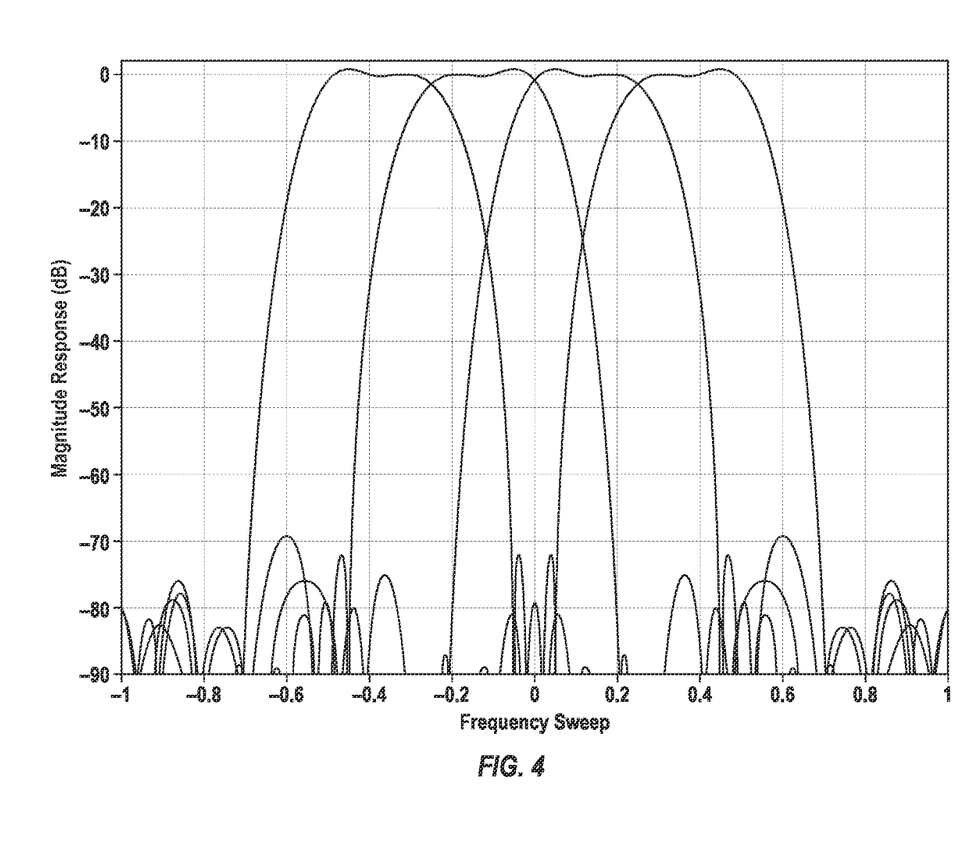
FIG. 4 is a graph of the magnitude response of a digital frequency channelizer in accordance with the output of stage 3 (output of the fdt3 blocks) of a digital frequency channelizer like that of FIG. 1.

FIG. 4 is a graph of the magnitude response of a digital frequency channelizer in accordance with the output of stage 3 (output of the fdt3 blocks) of a digital frequency channelizer like that of FIG. 1. FIG. 4 shows the 4 output spectral bands of stage 3.

Figure 5:
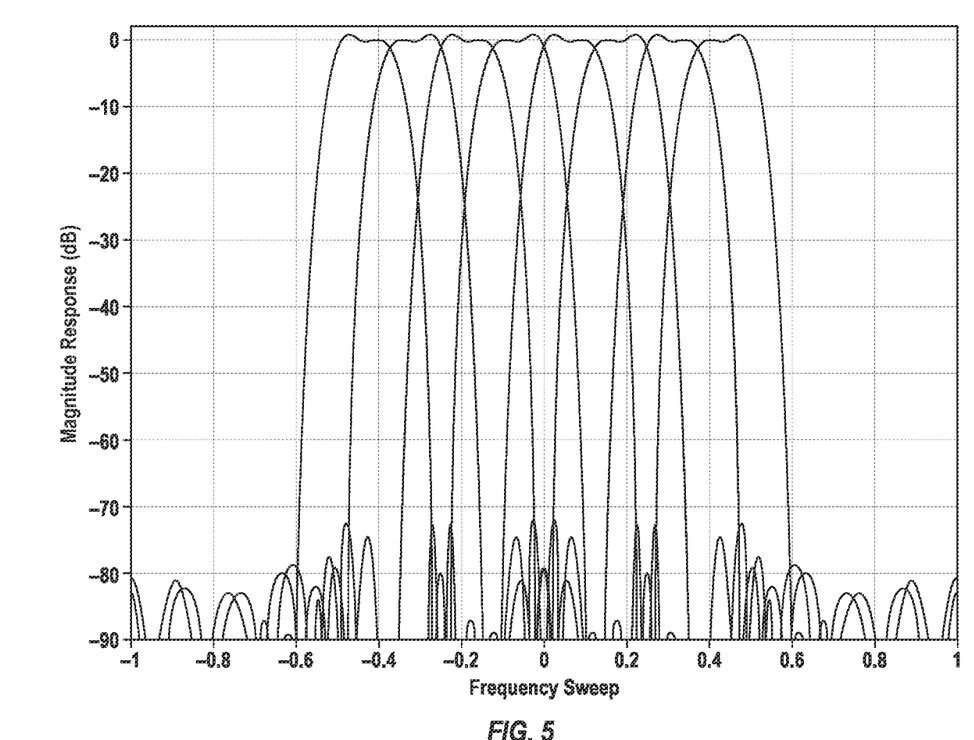
FIG. 5 is a graph of the magnitude response of a digital frequency channelizer in accordance with the output of stage 4 (output of the fdt4 blocks) of a digital frequency channelizer like that of FIG. 1.

FIG. 5 is a graph of the magnitude response of a digital frequency channelizer in accordance with the output of stage 4 (output of the fdt4 blocks) of a digital frequency channelizer like that of FIG. 1. FIG. 5 shows the 8 output spectral bands of stage 4.

Figure 6:
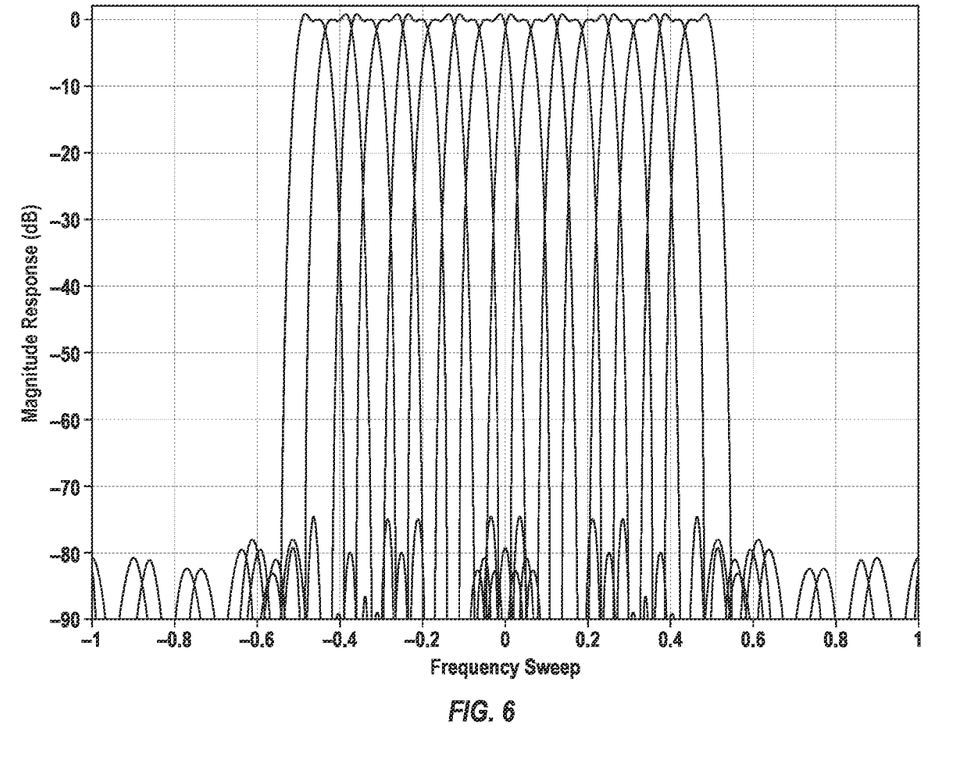
FIG. 6 is a graph of the magnitude response of a digital frequency channelizer in accordance with the output of stage 5 (output of the fdt5 blocks) of a digital frequency channelizer like that of FIG. 1.

FIG. 6 is a graph of the magnitude response of a digital frequency channelizer in accordance with the output of stage 5 (output of the fdt5 blocks) of a digital frequency channelizer like that of FIG. 1. FIG. 6 shows the 16 output spectral bands of stage 5.

Figure 7:
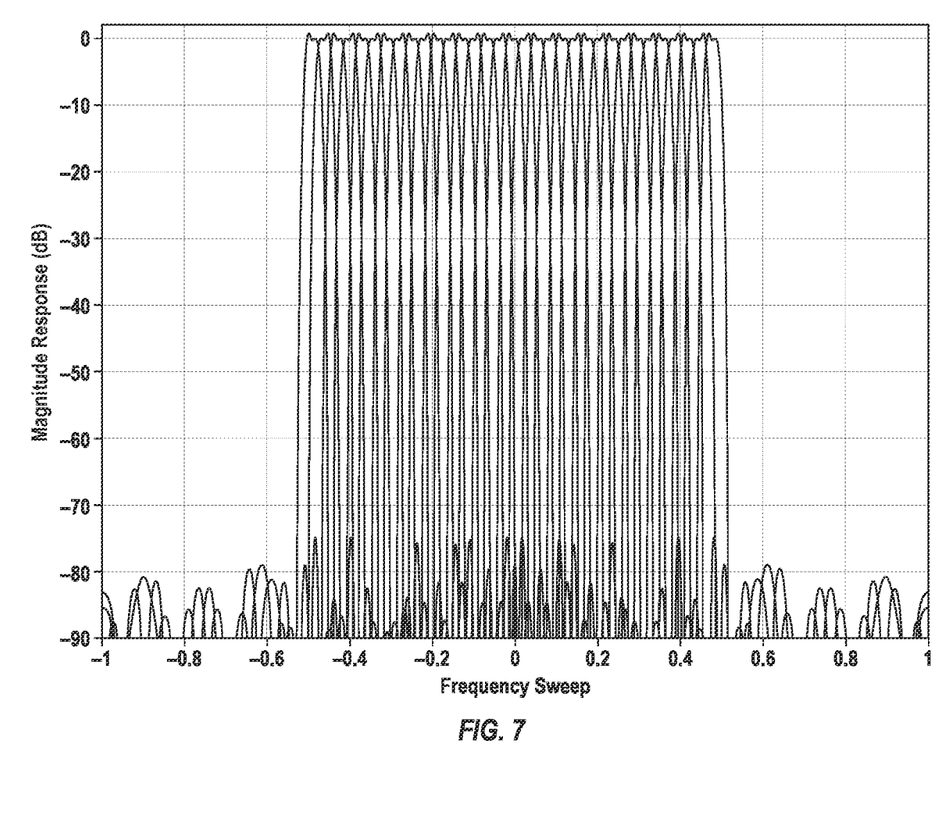
FIG. 7 is a graph of the magnitude response of a digital frequency channelizer in accordance with the output of stage 6 (output of the fdt6 blocks) of a digital frequency channelizer like that of FIG. 1.

FIG. 7 is a graph of the magnitude response of a digital frequency channelizer in accordance with the output of stage 6 (output of the fdt6 blocks) of a digital frequency channelizer like that of FIG. 1. FIG. 7 shows the 32 output spectral bands of stage 6.

Figure 8:
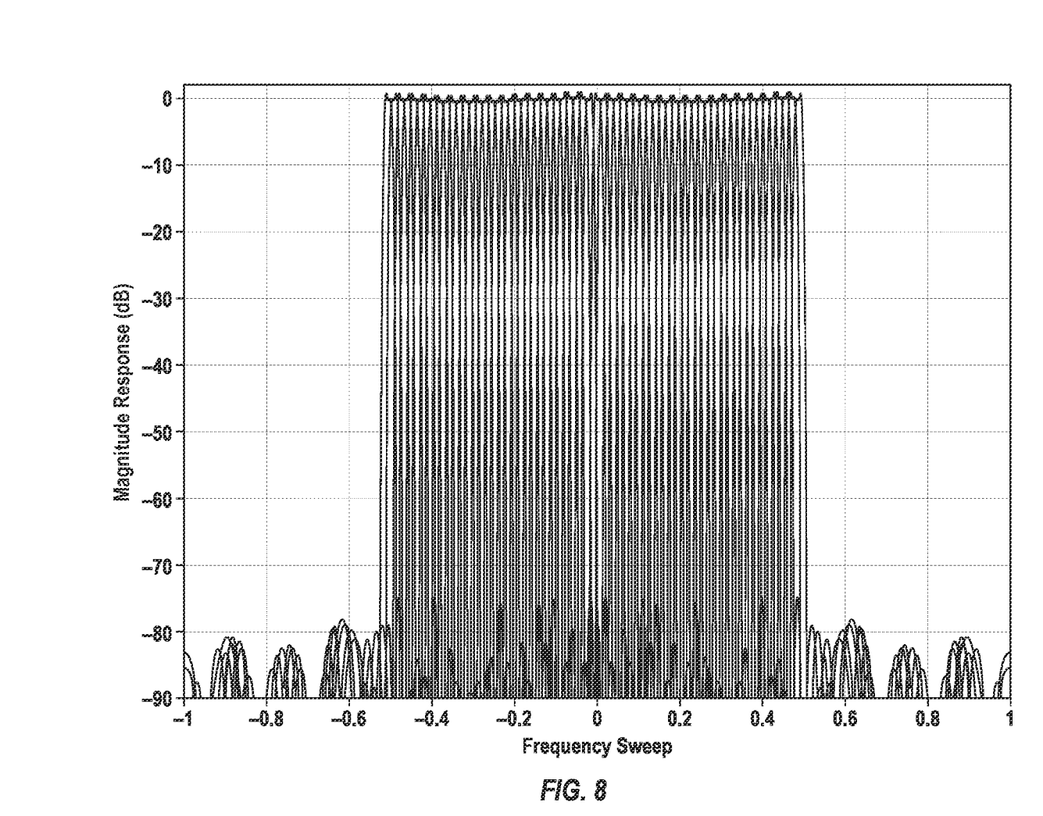
FIG. 8 is a graph of the magnitude response of a digital frequency channelizer in accordance with the output of stage 7 (output of the fdt7 blocks) of a digital frequency channelizer like that of FIG. 1.

FIG. 8 is a graph of the magnitude response of a digital frequency channelizer in accordance with the output of stage 7 (output of the fdt7 blocks) of a digital frequency channelizer like that of FIG. 1. FIG. 8 shows the 64 output spectral bands of stage 7.

Figure 9:
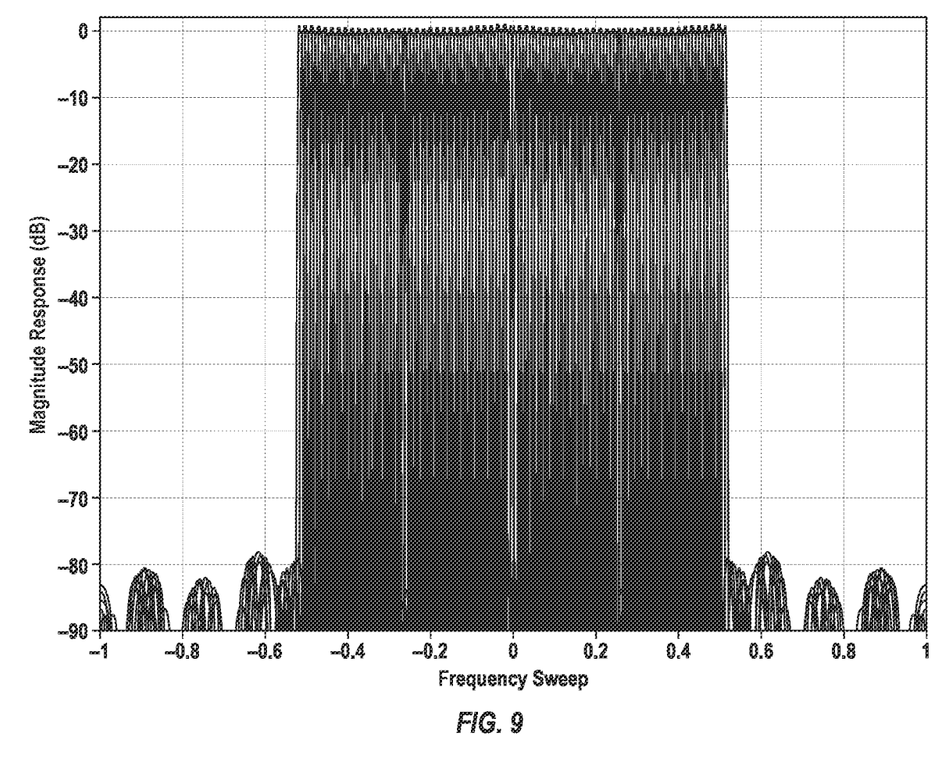
FIG. 9 is a graph of the magnitude response of a digital frequency channelizer in accordance with the output of stage 8 (output of the fdt8 blocks) of a digital frequency channelizer like that of FIG. 1.

FIG. 9 is a graph of the magnitude response of a digital frequency channelizer in accordance with the output of stage 8 (output of the fdt8 blocks) of a digital frequency channelizer like that of FIG. 1. FIG. 9 shows the 128 output spectral bands of stage 8.

The filter decimator tuner blocks described herein are described in some additional detail in U.S. patent application Ser. No. 12/772,105 filed on Apr. 30, 2010 and entitled "Digital Filter-Decimator-Tuner" in the name of Jerry R. Hinson and commonly assigned herewith. This application is hereby incorporated herein by reference as if set forth fully herein. It is to be noted that while the filter-decimator-tuner approach is presently preferred, the architecture of the present invention could be implemented with other functional blocks which filter, decimate and tune, but perhaps in a different order. Accordingly, unless expressly called out in the claims, the claims are not intended to be so limited.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for digital frequency channelization of a digitally sampled input stream having a first bandwidth, the method comprising:
   converting a first set of real samples from the input stream into a first plurality of complex samples with a first functional block performing filtering, decimation and tuning functions;
   converting the first plurality of complex samples into a first pair of consecutive USB and a first pair of consecutive LSB complex samples with a second functional block performing filtering, decimation and tuning functions;
   converting the first pair of consecutive USB and the first pair of consecutive LSB complex samples into a two pairs of complex USB and LSB complex samples with a pair of third functional blocks performing filtering, decimation and tuning functions; and
   applying the two pairs of complex USB and LSB complex samples to a string of n pairs third functional blocks each performing filtering, decimation and tuning functions.

2. The method of claim 1, wherein n is greater than or equal to 1.

3. The method of claim 1, wherein n is equal to at least 5.

4. The method of claim 1, wherein the first set of real samples are consecutive samples from the input stream.

5. The method of claim 4, wherein the first plurality of complex samples include consecutive samples from an output of the first functional block.

6. The method of claim 1, further comprising:
   providing a plurality of outputs of different bandwidth taken from at least two of the third pairs of functional blocks.

7. The method of claim 6, wherein said providing is performed simultaneously.

8. An apparatus for digital frequency channelization of a digitally sampled input stream having a first bandwidth, the method comprising:
   means for converting a first set of real samples from the input stream into a first plurality of complex samples with a first functional block configured to perform filtering, decimation and tuning functions;
   means for converting the first plurality of complex samples into a first pair of consecutive USB and a first pair of consecutive LSB complex samples with a second functional block configured to perform filtering, decimation and tuning functions;
   means for converting the first pair of consecutive USB and the first pair of consecutive LSB complex samples into a two pairs of complex USB and LSB complex samples with a pair of third functional blocks configured to perform filtering, decimation and tuning functions; and
   means for applying the two pairs of complex USB and LSB complex samples to a string of n pairs third functional blocks each configured to perform filtering, decimation and tuning functions.

9. The apparatus of claim 8, wherein n is greater than or equal to 1.

10. The apparatus of claim 8, wherein n is equal to at least 5.

11. The apparatus of claim 8, wherein the first set of real samples are consecutive samples from the input stream.

12. The apparatus of claim 11, wherein the first plurality of complex samples include consecutive samples from an output of the first functional block.

13. The apparatus of claim 8, further comprising:
   means for providing a plurality of outputs of different bandwidth taken from at least two of the third pairs of functional blocks.

14. The apparatus of claim 13, wherein the plurality of outputs are provided simultaneously.

15. The apparatus of claim 8, wherein the third pairs of functional blocks each include:
   a USB processing path coupled to receive a complex input sample and output a complex output sample, the USB processing path including a first USB FIR filter configured to receive a portion of the complex input signal and output a filtered USB signal, a decimator configured to decimate the filtered USB signal and output a filtered decimated complex USB signal, a USB tuner configured to receive the filtered decimated complex USB signal and a USB tuning signal and output a tuned USB complex signal, and output the complex output sample; and
   an LSB processing path coupled to receive the complex input sample and output a complex output sample, the LSB processing path including a first LSB FIR filter configured to receive a portion of the complex input signal and output a filtered LSB signal, a decimator configured to decimate the filtered LSB signal and output a filtered decimated complex LSB signal, an LSB tuner configured to receive the filtered decimated complex LSB signal and an LSB tuning signal and output a tuned LSB complex signal, and output the complex output signal.

* * * * *